(12) United States Patent
Park et al.

(10) Patent No.: US 10,721,091 B2
(45) Date of Patent: Jul. 21, 2020

(54) METHOD FOR TRANSMITTING AND RECEIVING SIGNALS IN WIRELESS LAN SYSTEM AND APPARATUS THEREFOR

(71) Applicant: LG ELECTRONICS INC., Seoul (KR)

(72) Inventors: Sungjin Park, Seoul (KR); Kyungtae Jo, Seoul (KR); Jinmin Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/083,864

(22) PCT Filed: Mar. 9, 2017

(86) PCT No.: PCT/KR2017/002568
§ 371 (c)(1),
(2) Date: Sep. 10, 2018

(87) PCT Pub. No.: WO2017/155329
PCT Pub. Date: Sep. 14, 2017

(65) Prior Publication Data
US 2019/0068396 A1 Feb. 28, 2019

Related U.S. Application Data

(60) Provisional application No. 62/334,461, filed on May 11, 2016, provisional application No. 62/306,084, filed on Mar. 10, 2016.

(51) Int. Cl.
*H04L 12/28* (2006.01)
*H04W 84/12* (2009.01)
*H04L 27/26* (2006.01)

(52) U.S. Cl.
CPC ...... *H04L 12/2863* (2013.01); *H04L 27/2602* (2013.01); *H04L 27/2611* (2013.01); *H04L 27/2666* (2013.01); *H04L 27/2672* (2013.01); *H04W 84/12* (2013.01)

(58) Field of Classification Search
CPC ... H04L 12/2863–2867; H04L 27/2602; H04L 27/261; H04L 27/2611; H04L 27/2666; H04L 27/2672
See application file for complete search history.

(56) References Cited

U.S. PATENT DOCUMENTS

| 2005/0180341 | A1 | 8/2005 | Nelson et al. |
| 2014/0086228 | A1 | 3/2014 | Kwon |
| 2015/0146653 | A1 | 5/2015 | Zhang et al. |

(Continued)

OTHER PUBLICATIONS

PCT International Application No. PCT/KR2017/002568, Written Opinion of the International Searching Authority dated Jun. 26, 2017, 17 pages.

*Primary Examiner* — Pao Sinkantarakorn
(74) *Attorney, Agent, or Firm* — Lee Hong Degerman Kang Waimey

(57) ABSTRACT

The present invention relates to a method for transmitting and receiving, by a station, signals in a wireless WLAN system. More particularly, the present specification proposes a frame structure for transmitting signals by bonding a plurality of channels by the station, and a method for transmitting and receiving signals on the basis of the same frame structure, and an apparatus therefor.

15 Claims, 18 Drawing Sheets

(56) References Cited

U.S. PATENT DOCUMENTS

2015/0365195 A1 12/2015 Yang et al.
2015/0381399 A1 12/2015 Taghavi Nasrabadi et al.
2016/0088600 A1* 3/2016 Yang .................. H04W 72/044
370/329

* cited by examiner

METHOD FOR TRANSMITTING AND RECEIVING SIGNALS IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/002568, filed on Mar. 9, 2017, which claims the benefit of U.S. Provisional Application No. 62/306,084, filed on Mar. 10, 2016, and 62/334,461, filed on May 11, 2016, the contents of which are all hereby incorporated by reference herein in their entireties.

TECHNICAL FIELD

The present invention relates to an operation method of a station in a wireless LAN (WLAN) system, and more specifically, to a frequency division multiple access (FDMA) frame structure for transmitting, by a station, a signal by bonding to a plurality of channels, a method for transmitting a signal on the basis of the FDMA frame structure and a device therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.1 lay, for introducing channel bonding and MIMO technology to IEEE 802.11ad systems for the first time, is being discussed.

DISCLOSURE

Technical Problem

A frame structure for transmitting a signal by bonding a plurality of channels is required to be defined.

In this respect, the present invention defines a frame structure for transmitting a signal by an 11ay UE (e.g., station) by bonding a plurality of channels, and a method for transmitting and receiving a signal based on the frame structure.

Particularly, the present invention defines an FDMA frame structure for efficiently transmitting and receiving a signal between 11ay UEs if capabilities (e.g., channel bonding capability, a fast fourier transform (FFT) size, etc.) of the 11ay UEs are different from each other, and a method for transmitting and receiving a signal on the basis of the frame structure.

Technical Solution

In one aspect of the present invention to solve the aforementioned problems, a method for transmitting a signal of a first station (STA) in a wireless LAN (WLAN) system comprises determining a frame structure for bonding a plurality of channels through which a signal is to be transmitted; and transmitting the signal to a second STA on the basis of the determined frame structure, wherein the determined frame structure includes one or more first direct current (DC) tones located at a center of a bandwidth corresponding to the bonded channels and one or more second DC tones located to be spaced apart from the first DC tones at a certain interval.

Meanwhile, in another aspect of the present invention, a method for receiving a signal of a first station (STA) in a wireless LAN (WLAN) system comprises determining a frame structure for bonding a plurality of channels through which a signal is to be transmitted by a second STA; and receiving the signal from the second STA on the basis of the determined frame structure, wherein the determined frame structure includes one or more first direct current (DC) tones located at a center of a bandwidth corresponding to the bonded channels and one or more second DC tones located to be spaced apart from the first DC tones at a certain interval.

Meanwhile, in still another aspect of the present invention, a station device for transmitting a signal in a wireless LAN (WLAN) system comprises a transceiver having one or more radio frequency (RF) chains, configured to transmit and receive a signal to and from a second STA; and a processor connected with the transceiver, processing the signal transmitted to and received from the second STA, wherein the processor is configured to determine a frame structure for bonding a plurality of channels through which a signal is to be transmitted and transmit the signal to the second STA on the basis of the determined frame structure, and wherein the determined frame structure includes one or more first direct current (DC) tones located at a center of a bandwidth corresponding to the bonded channels and one or more second DC tones located to be spaced apart from the first DC tones at a certain interval.

Meanwhile, in further still another aspect of the present invention, a station device for receiving a signal in a wireless LAN (WLAN) system comprises a transceiver having one or more radio frequency (RF) chains, configured to transmit and receive a signal to and from a second STA; and a processor connected with the transceiver, processing the signal transmitted to and received from the second STA, wherein the processor is configured to determine a frame structure for bonding a plurality of channels through which a signal is to be transmitted by the second STA and receive the signal from the second STA on the basis of the determined frame structure, and wherein the determined frame structure includes one or more first direct current (DC) tones located at a center of a bandwidth corresponding to the bonded channels and one or more second DC tones located to be spaced apart from the first DC tones at a certain interval.

In this case, frame structure may be determined based on the number of the bonded channels.

For example, the second DC tones may be located to correspond to a center frequency of each of the bonded channels if the number of the bonded channels is 2.

For another example, the second DC tones may be located in a region between neighboring channels of the bonded channel if the number of the bonded channels is 3.

Alternatively, the frame structure may be determined based on the number of the bonded channels and indexes of the bonded channels.

For example, if the bonded channels are first and second channels of first to fourth channels sequentially located in a frequency domain, the second DC tones may be located to correspond to a center frequency of the second channel.

For another example, if the bonded channels are second and third channels of first to fourth channels sequentially located in a frequency domain, the second DC tones may be located to correspond to a center frequency of the second channel and a center frequency of the third channel.

For still another example, if the bonded channels are third and fourth channels of first to fourth channels sequentially located in a frequency domain, the second DC tones may be located to correspond to a center frequency of the fourth channel.

For further still another example, if the bonded channels are first to third channels of first to fourth channels sequentially located in a frequency domain, the second DC tones are located in a region between the second channel and the third channel.

For further still another example, if the bonded channels are second to fourth channels of first to fourth channels sequentially located in a frequency domain, the second DC tones may be located in a region between the second channel and the third channel.

Meanwhile, the frame structure may further includes pilot tones and data tones.

At this time, one or more of the pilot tones or the data tones may be located in a region between the first DC tone and the second DC tone.

Advantageous Effects

Through the aforementioned configuration, the stations according to the present invention may mutually transmit and receive a signal without any error by bonding a plurality of channels.

Particularly, even though the stations according to the present invention, which transmit and receive a signal, have their respective capabilities (e.g., channel bonding capability, FFT size, etc.) different from each other, the stations may easily transmit and receive the signal.

The effects that may be obtained by the present invention are not limited to the above-mentioned effects, and other effects not mentioned above will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

1-1. Generals of WLAN System

Figure 1:
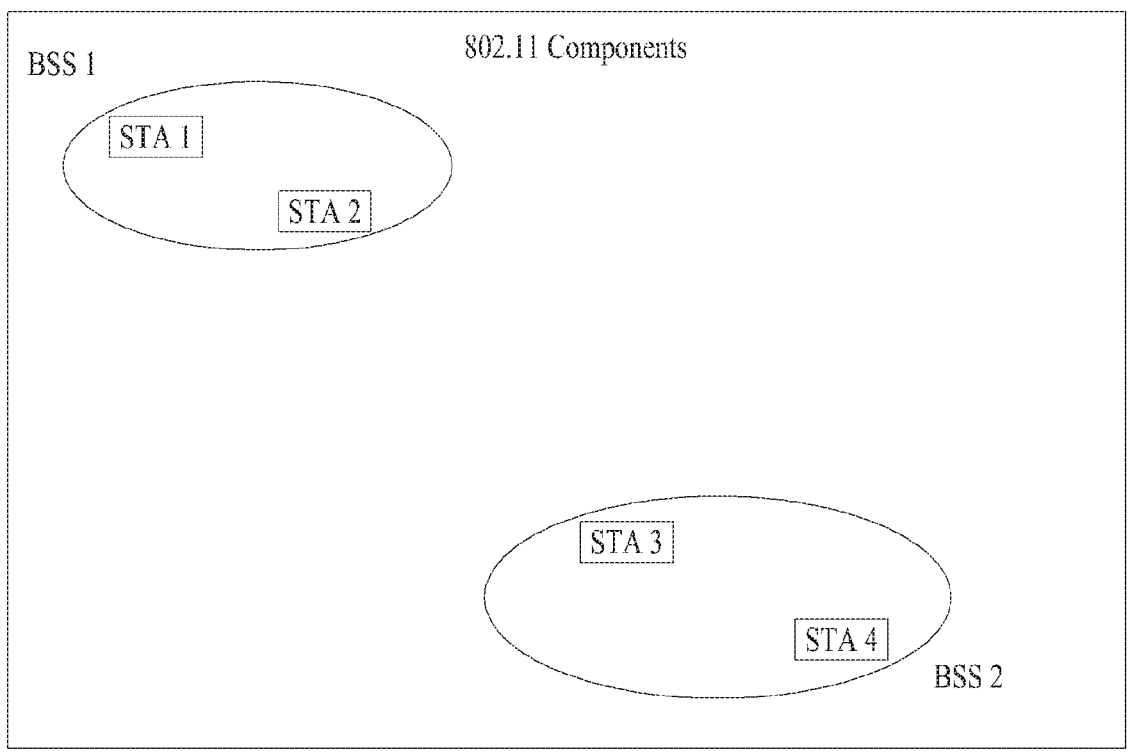
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
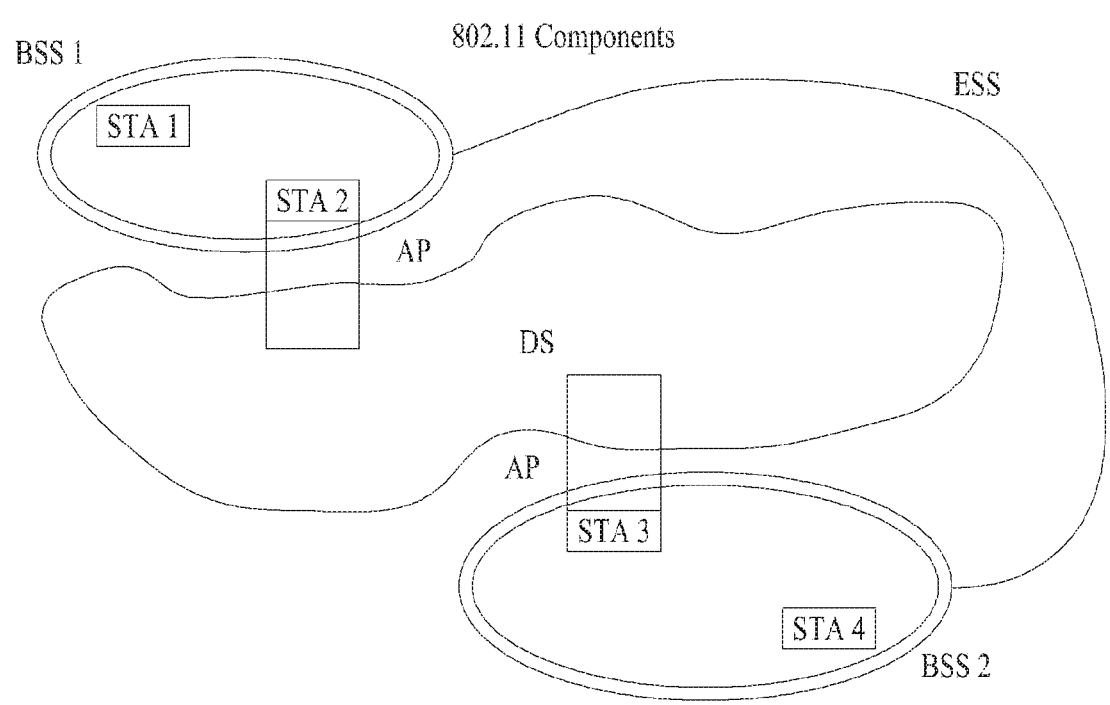
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2 Channel Bonding in WLAN System

Figure 3:
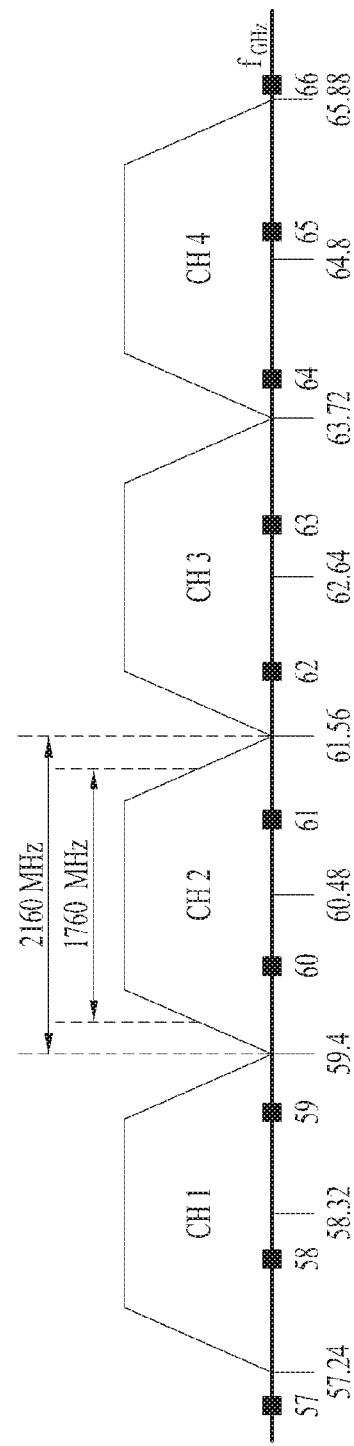
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
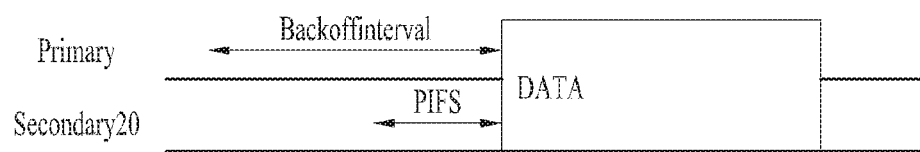
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
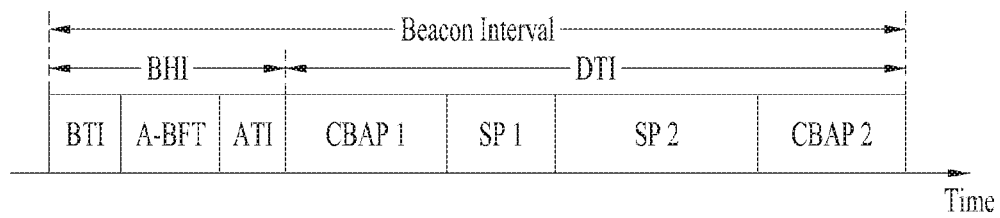
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used to satisfy different requirements (e.g., high throughput or stability). Depending on the system, only some of these modes may be supported.

Figure 6:
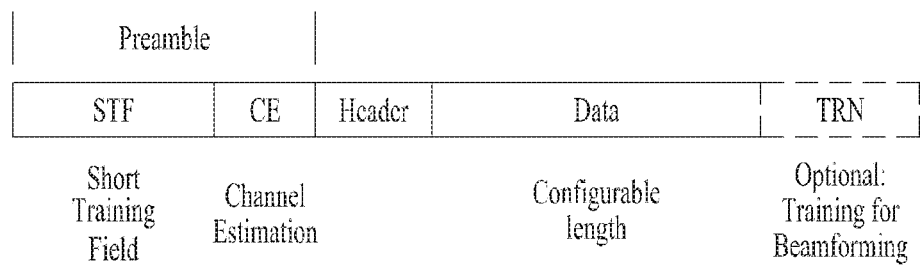
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
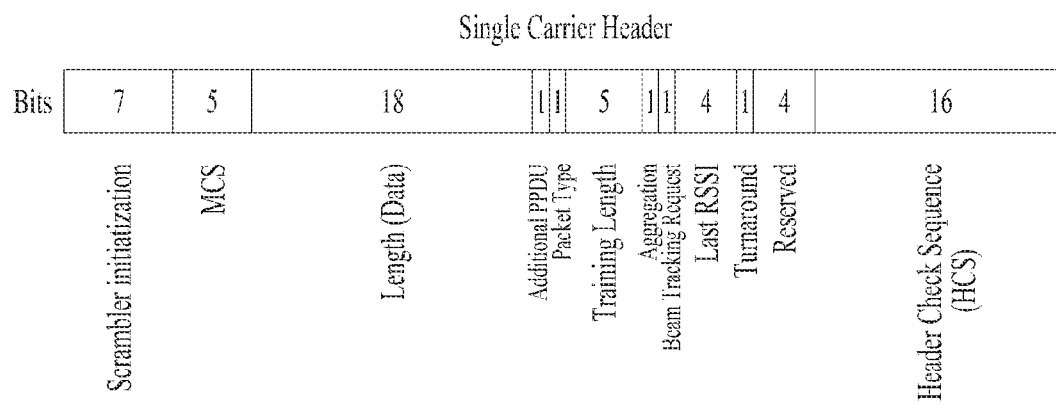
FIGS. 7 and 8 are diagrams illustrating configuration of the header field of the radio frame of FIG. 6.
Figures 8, 9:
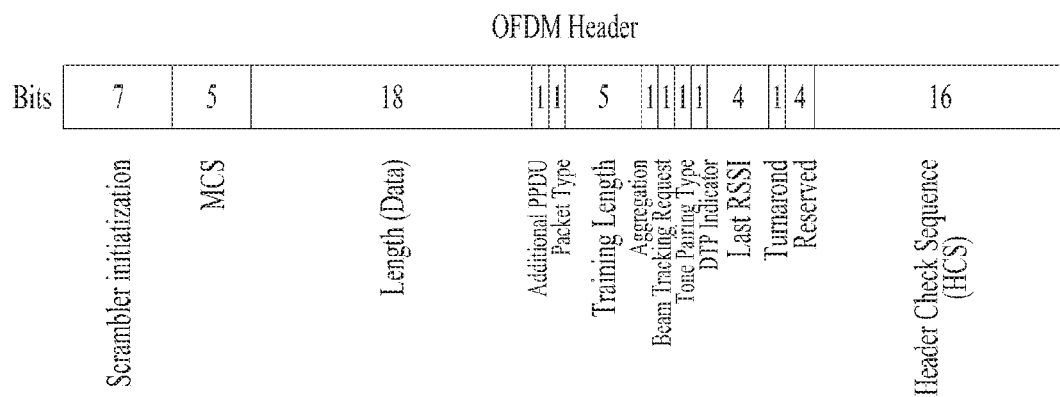
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

2. OFDM Frame Structure Applicable to the Present Invention

Prior to description of an OFDM frame structure suggested in the present invention, an OFDM frame structure defined in an IEEE 802.11ad system will be described.

Figure 10:
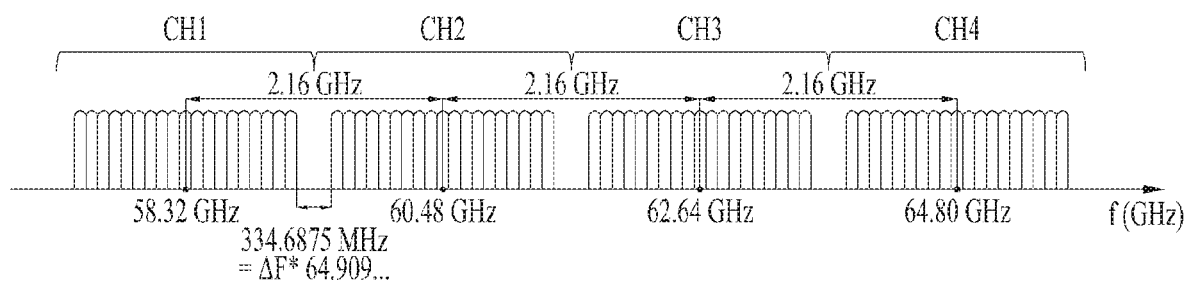
FIG. 10 is a diagram illustrating an OFDM frame structure defined in an IEEE 802.11ad system.

FIG. 10 is a diagram illustrating an OFDM frame structure defined in an IEEE 802.11ad system.

As shown in FIG. 10, the IEEE 802.11ad system has center frequencies of 58.32 GHz, 60.48 GHz, 62.64 GHz, and 64.80 GHz per four channels (each of which is 2.16 GHz). At this time, a bandwidth reserved by OFDM subcarriers in one channel is about 1.83 GHz, and a space of about 0.33 GHz (or 334.6875 MHz) exists between respective channels.

However, since the IEEE 802.11ay system suggested in the present invention supports maximum eight channels and channel bonding of one or more, a new OFDM frame structure having a wide bandwidth, which may support channel bonding, will be required.

Figure 11:
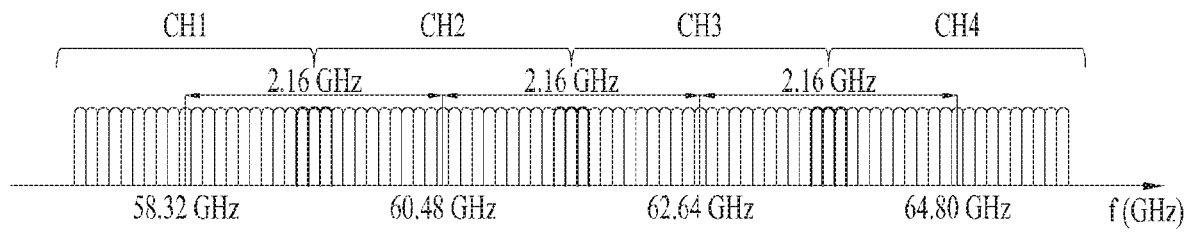
FIG. 11 is a diagram illustrating an OFDM frame structure suggested in the present invention.

In this case, for compatibility with the legacy UE (e.g., 11ad UE), the OFDM frame structure of FIG. 10 may be used, and an OFDM frame structure of FIG. 11 may be used as an example.

FIG. 11 is a diagram illustrating an OFDM frame structure suggested in the present invention.

As shown in FIG. 11, an example of an OFDM frame suggested in the present invention may include an OFDM frame structure in which each channel and a space between channels are filled with OFDM subcarriers. At this time, 5.15625 MHz may be applied to a value of the OFDM subcarrier spacing.

However, a space between channels defined in the 11ad system corresponds to 334.6875 MHz, and it is difficult to locate OFDM subcarriers of 5.1565 MHz in a corresponding space as much as a certain number. Therefore, the OFDM frame structure defined in the 11ad system may be used in the present invention as much as possible, wherein positions of subcarriers are shifted to both sides based on a specific channel (CH2 or primary channel on the system), whereby a new OFDM frame structure that includes a plurality of channels (e.g., four channels) is suggested in the present invention. Although FIG. 11 illustrates an OFDM frame structure that includes four channels, the OFDM frame structure according to the present invention may be applied to an OFDM frame structure that includes 6 channels or 8 channels. For example, in case of the OFDM frame structure that includes 8 channels, the corresponding OFDM structure may be configured by shifting positions of subcarriers based on CH4 or CH5.

In this case, the OFDM frame structure according to the present invention may maintain the existing OFDM subcarrier spacing, and may locate 66 new subcarriers in the space between channels. At this time, a center frequency spacing of each channel may be 2.165625 GHz.

The above configuration is characterized as follows.

A frequency spacing between the channels defined in the 11ad system is not configured by an integer multiple of the subcarrier spacing.

Therefore, OFDM tone plans shifted based on a center frequency of a specific channel (e.g., CH2) may be unified.

The number of DC tones in a tone plan for 2-channel to 4-channel bonding may be 3 or 5 in accordance with offset according to the shift. However, the number of the DC tones is only a numeric value suggested as an example, and may be set differently depending on implementation embodiments.

As another example, the OFDM frame structure of FIG. 11 may be defined based on FFT size and subcarrier spacing independent from the 11ad system. In this case, 66 OFDM subcarriers or other number of OFDM subcarriers may be located in the space between the channels.

An access point (AP) or 11ay UE may transmit data through a method such as single channel transmission, channel bonding, channel aggregation and multi-input multi-output (MIMO) by using the OFDM frame structure as shown in FIG. 11.

The 11ay system suggested in the present invention suggests that UEs having various capabilities (e.g., radio frequency (RF) size, the number of RFs, the number of antennas, channel switching capability, non-primary channel operation capability, etc.) should be designed to mutually transmit and receive data. The capability of the UE considered in this case means a capability for channel bonding or channel aggregation.

Therefore, the present invention suggests an OFDM frame structure in which 11ay UEs having the same FFT size or different FFT sizes coexist and mutually transmit and receive data.

Hereinafter, an OFDM frame structure suggested in the present invention will be described based on an OFDM frame structure applicable to all of 11ay UEs having the same FFT size or 11ay UEs having different FFT sizes. If there is no special description, the OFDM structure of the present invention may be understood as the OFDM structure applicable to all of 11ay UEs having the same FFT size or 11ay UEs having different FFT sizes.

2.1. First Option

Figure 12:
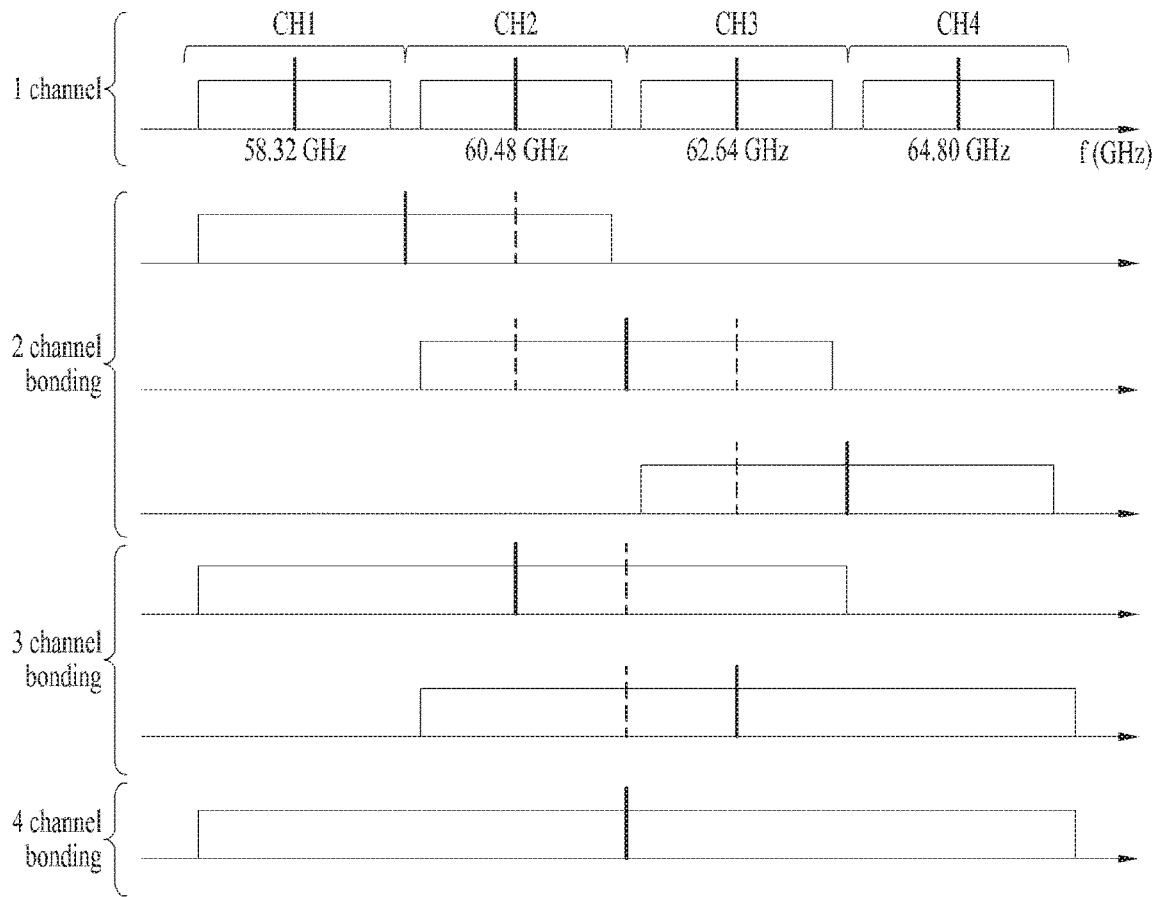
FIG. 12 is a diagram illustrating examples of an applicable OFDM frame structure considering channel bonding in accordance with the present invention.

FIG. 12 is a diagram illustrating examples of an applicable OFDM frame structure considering channel bonding in accordance with the present invention. In this case, FIG. 12 illustrates an OFDM frame structure based on the 11ay system that supports four channels, and the corresponding configuration of FIG. 12 may adaptively be applied to the case that the 11ay system suggested in the present invention may supports channels more than four channels, such as six channels or eight channels.

In FIG. 12, a structure marked with a rectangular type illustrates a frame structure used to transmit a data packet.

A dark solid line denotes a position of a direct current (DC) tone required when an 11ay UE receives a frame corresponding to its capability, and a dotted line denotes a position of a DC required when an 11ay UE receives a frame corresponding to a bandwidth smaller than its capability. The dark solid line and the dotted line may be referred to as a first DC tone and a second DC tone, respectively.

Also, since a separate DCI is not required for an empty space in FIG. 12 (since a separate signal is not defined in a corresponding space), it is to be understood by the person with ordinary skill in the art that a position of a DC is not marked separately.

In case of transmission based on 1 channel (2.16 GHz), the same OFDM frame structure may be configured regardless of a channel through which a signal is transmitted.

In case of transmission based on 2-channel bonding, as shown in FIG. 12, three types of OFDM frame structures may be considered in accordance with a channel through which 2-channel bonded signal is transmitted. In more detail, it is assumed that an flay UE having a 3-channel bonding capability receives a 2-channel bonded signal. At this time, in order that the flay UE having a 2-channel bonding capability properly receives the 2-channel bonded signal, DC should be located at a middle position of a case that CH1 to CH3 or CH2 to CH4 are bonded. Therefore, as shown in FIG. 12, the three types of OFDM frame structures may be applied to the OFDM frame structure according to transmission for 2-channel bonding in accordance with a channel which is transmitted.

In case of transmission based on 3-channel bonding, as shown in FIG. 12, two types of OFDM frame structures may be considered in accordance with channels through which a signal is transmitted. In more detail, the two types of OFDM frame structures shown in FIG. 12 may be considered considering the case that an 11ay UE having a 4-channel bonding capability receives a 3-channel bonded signal.

In case of transmission based on 4-channel bonding, the same OFDM frame structure may always be used.

2.2. Second Option

According to the first option described as above, since the OFDM frame structure is determined depending on a channel through which a signal bonded with one or more channels is transmitted, a problem may occur in that complexity is increased. Therefore, as the second option of the OFDM frame structure according to the present invention, an OFDM frame structure unified per frequency bandwidth (or per the number of bonded channels), which is a modified embodiment of the first option, is suggested.

Figure 13:
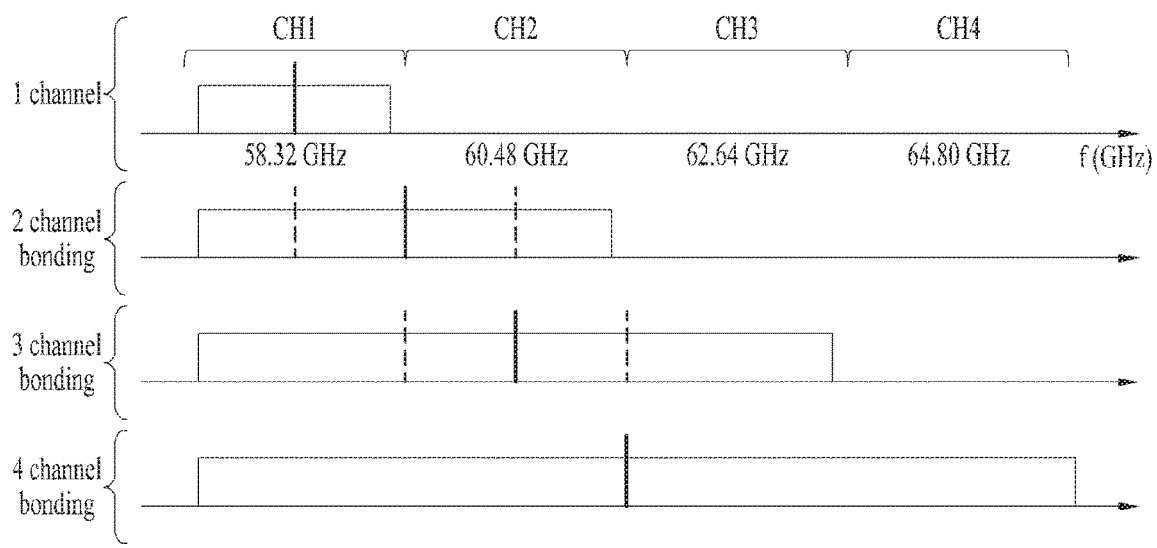
FIG. 13 is a diagram illustrating other examples of an applicable OFDM frame structure considering channel bonding in accordance with the present invention.

FIG. 13 is a diagram illustrating other examples of an applicable OFDM frame structure considering channel bonding in accordance with the present invention.

As shown in FIG. 13, a single OFDM frame structure may be used in accordance with the number of channels subjected to channel bonding.

Hereinafter, the OFDM frame structure applicable in accordance with each channel bonding will be described in detail.

2.2.1. 1-Channel Bonding

Figure 14:
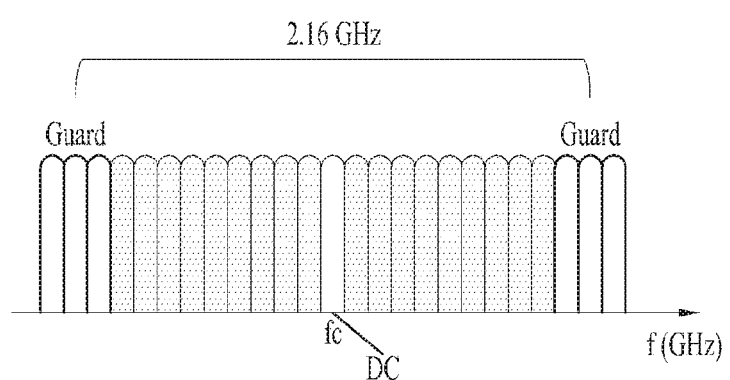
FIG. 14 is a diagram illustrating an OFDM frame structure for 1-channel bonding according to a second option of the present invention.

FIG. 14 is a diagram illustrating an OFDM frame structure for 1-channel bonding according to a second option of the present invention.

As shown in FIG. 14, as the OFDM frame structure for 1-channel bonding, an OFDM numerology or OFDM frame structure defined in the 11ad system may be reused considering compatibility with the legacy UE (e.g., 11ad UE).

At this time, the OFDM frame structure may include 355 subcarriers, which may include 3 DC tones (or subcarriers), 16 pilot tones (or subcarriers), and 336 data tones (or subcarriers).

In FIG. 14, $f_c$ means a center frequency, and DC means a certain number of tones (e.g., three tones) based on the center frequency of the channel. If three tones are used as DC, indexes (−1, 0 and 1) may be used for the three tones.

Guard tones may mean tones except the aforementioned 355 subcarriers when 512 FFT is applied.

Also, the aforementioned pilot tones may be inserted at a spacing of 20 subcarriers (or tones). For example, indexes (−150, −130, −110, −90, −70, −50, −30, −10, 10, 30, 50, 70, 90, 110, 130, 150) may be used for the pilot tones.

2.2.2. 2-Channel Bonding

Figure 15:
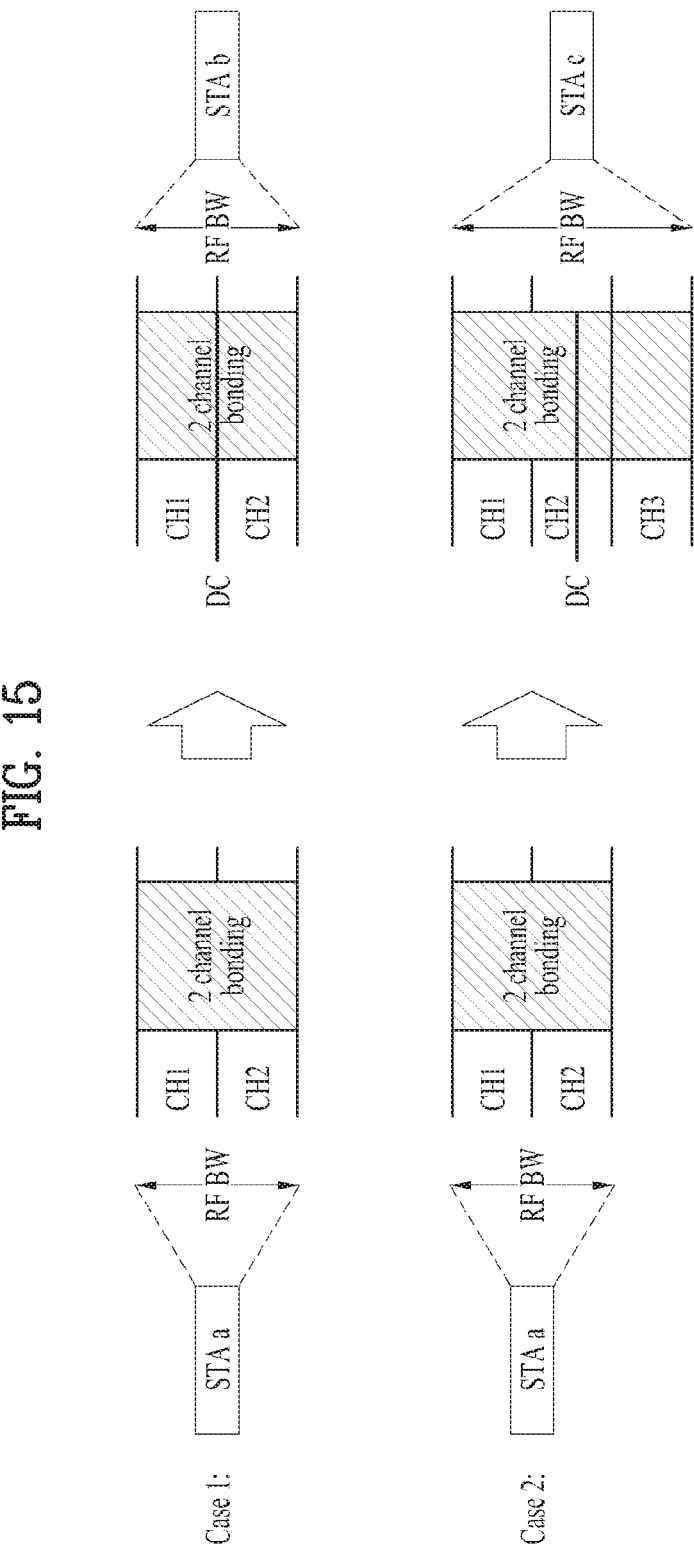
FIG. 15 is a diagram illustrating a position of a DC tone required in accordance with capability (e.g., FFT size) of a UE which receives 2-channel bonded signal.

As described in the first option, in case of 2-channel bonding, a position of DC tone which is required may be varied depending on capability (FFT size, etc.) of an 11ay UE which receives a corresponding signal. FIG. 15 is a diagram illustrating a position of a DC tone required in accordance with capability (e.g., FFT size) of a UE which receives 2-channel bonded signal.

As shown in FIG. 15, if the capability (e.g., FFT size) of the UE which receives a 2-channel bonded signal is the same as a bandwidth of 2-channel bonding (case 1 of FIG. 15), the DC tone is required to be located between two channels subjected to channel bonding, whereas if the capability (e.g., FFT size) of the UE which receives a 2-channel bonded signal is the same as a bandwidth of 3-channel bonding (case 2 of FIG. 15), the DC tone may be required to be located at the center of the bandwidth corresponding to three channels.

The OFDM frame structure for 2-channel bonding according to the present invention should satisfy all of the above cases. Therefore, the present invention suggests the OFDM frame structure for 2-channel bonding.

Figure 16:
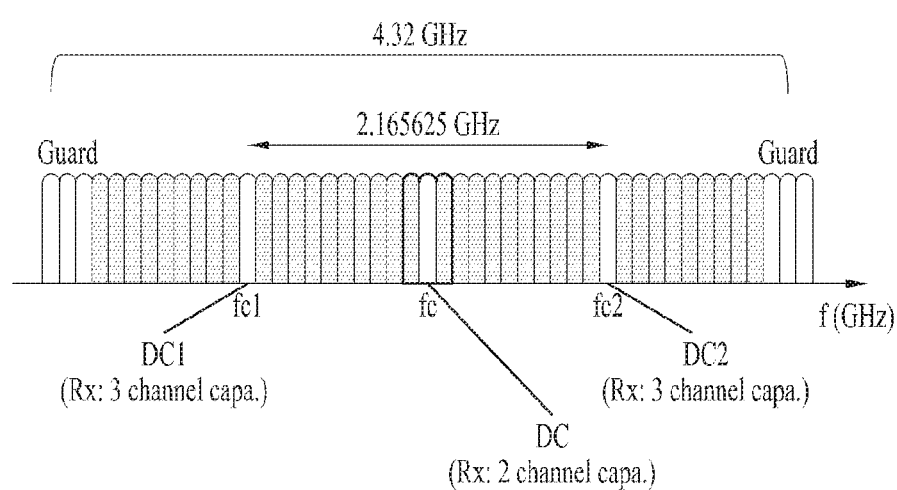
FIG. 16 is a diagram illustrating an OFDM frame structure for 2-channel bonding according to a second option of the present invention.

FIG. 16 is a diagram illustrating an OFDM frame structure for 2-channel bonding according to a second option of the present invention.

In FIG. 16, $f_c$ means a center frequency of a bandwidth corresponding to two channels, $f_{c1}$ means a center frequency of a left channel of the channels subjected to 2-channel bonding, and $f_{c2}$ means a center frequency of a right channel of the channels subjected to 2-channel bonding. At this time, a position of $f_{c1}$ may correspond to the center of subcarriers corresponding to a tone index −210, and a position of $f_{c2}$ may correspond to the center of subcarriers corresponding to a tone index 210.

DC means a certain number of tones based on a center frequency of a bandwidth corresponding to two channels. For example, if three tones are used as DC tones, the three tones may have indexes (−1, 0 and 1). DC1 means a certain number of tones based on the center frequency of the left channel of the channels subjected to 2-channel bonding, and DC2 means a certain number of tones based on the center frequency of the right channel of the channels subjected to 2-channel bonding. If three tones are used as tones applied to DC1 and DC2 in the same manner as the above DC, DC1 may include tones corresponding to tone indexes (−211, −210, −209), and DC2 may include tones corresponding to tone indexes (211, 210, 209).

As described above, the number of tones corresponding to DC, DC1, and DC2 may be set to 3 based on the center frequency, may be set to 1 corresponding to the center frequency, or may be set to 5 based on the center frequency. Also, two of the three tones based on the center frequency may be configured.

Also, pilot tones may be inserted in accordance with various methods. For example, the pilot tones may be inserted to tone positions having the following tone indexes.

1) Tone indexes=(−370, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 370)

2) Tone indexes=(−370, −350, −330, −310, −290, −270, −250, −230, −190, −170, −150, −130, −110, −90, −70, −50, −30, −10, 10, 30, 50, 70, 90, 110, 130, 150, 170, 190, 230, 250, 270, 290, 310, 330, 350, 370)

For another example, pilot tone indexing of all combinations which may use the pilot tones used for the two indexing methods as much as possible may also be used.

2.2.3. 3-Channel Bonding

Figure 17:
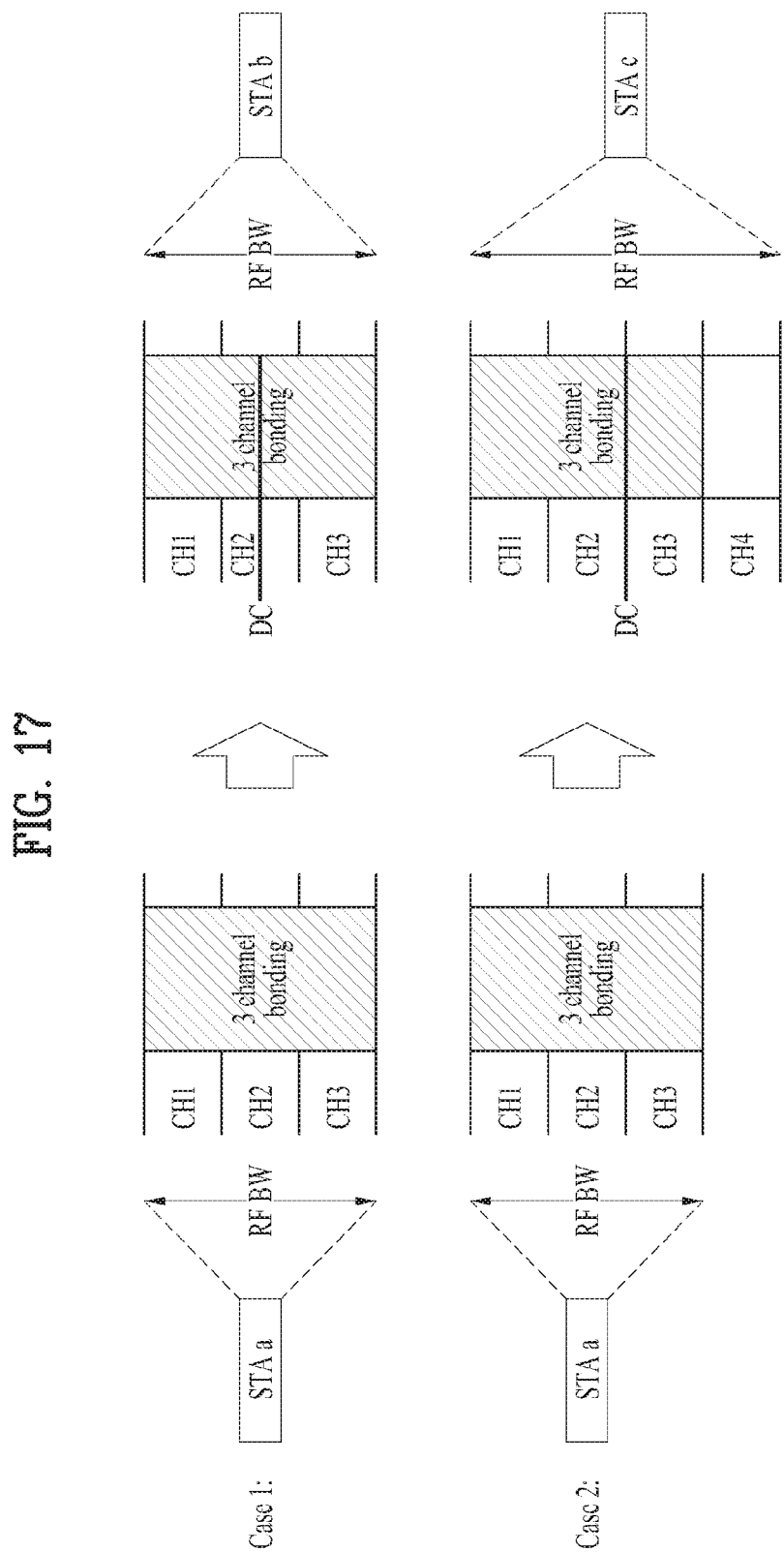
FIG. 17 is a diagram illustrating a position of a DC tone required in accordance with capability (e.g., FFT size) of a UE which receives 3-channel bonded signal.

As described in the first option, in case of 3-channel bonding, the position of the DC tone which is required may be varied depending on the capability (FFT size, etc.) of the 11ay UE which receives the corresponding signal. FIG. 17 is a diagram illustrating a position of a DC tone required in accordance with capability (e.g., FFT size) of a UE which receives a 3-channel bonded signal.

As shown in FIG. 17, if the capability (e.g., FFT size) of the UE which receives a 3-channel bonded signal is the same as a bandwidth of 3-channel bonding (case 1 of FIG. 17), the DC tone is required to be located at the center of the bandwidth corresponding to three channels subjected to channel bonding, whereas if the capability (e.g., FFT size) of the UE which receives a 3-channel bonded signal is the same as a bandwidth of 4-channel bonding (case 2 of FIG. 17), the DC tone may be required to be located at the center of the bandwidth corresponding to four channels.

The OFDM frame structure for 3-channel bonding according to the present invention should satisfy all of the above cases. Therefore, the present invention suggests the OFDM frame structure for 3-channel bonding.

Figure 18:
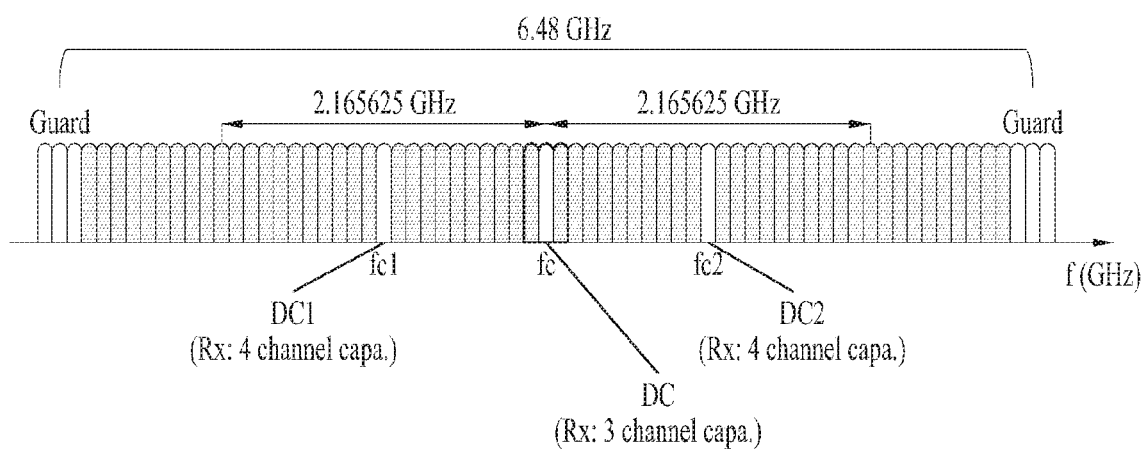
FIG. 18 is a diagram illustrating an OFDM frame structure for 3-channel bonding according to a second option of the present invention.

FIG. 18 is a diagram illustrating an OFDM frame structure for 3-channel bonding according to the second option of the present invention.

In FIG. 18, $f_c$ means a center frequency of a bandwidth corresponding to three channels, $f_{c1}$ means a center frequency between a first channel and a second channel from a left side of the channels subjected to 3-channel bonding, and $f_{c2}$ means a center frequency between a first channel and a second channel from a right side of the channels subjected to 3-channel bonding. At this time, a position of $f_{c1}$ may correspond to the center of subcarriers corresponding to a tone index −210, and a position of $f_{c2}$ may correspond to the center of subcarriers corresponding to a tone index 210.

DC means a certain number of tones based on a center frequency of a bandwidth corresponding to three channels. For example, if three tones are used as DC tones, the three tones may have indexes (−1, 0 and 1). DC1 means a certain number of tones based on the center frequency between a first channel and a second channel from the left side of the channels subjected to 3-channel bonding, and DC2 means a certain number of tones based on the center frequency between the first channel and the second channel from the right side of the channels subjected to 2-channel bonding. If three tones are used as tones applied to DC1 and DC2 in the same manner as the above DC, DC1 may include tones corresponding to tone indexes (−211, −210, −209), and DC2 may include tones corresponding to tone indexes (211, 210, 209).

As described above, the number of tones corresponding to DC, DC1, and DC2 may be set to 3 based on the center frequency, may be set to 1 corresponding to the center frequency, or may be set to 5 based on the center frequency. Also, two of the three tones based on the center frequency may be configured.

Also, pilot tones may be inserted in accordance with various methods. For example, the pilot tones may be inserted to tone positions having the following tone indexes.

1) Tone indexes=(−570, −550, −530, −510, −490, −470, −450, −430, −410, −390, −370, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 370, 390, 410, 430, 450, 470, 490, 510, 530, 550, 570)

2) Tone indexes=(−570, −550, −530, −510, −490, −470, −450, −430, −410, −390, −370, −350, −330, −310, −290, −270, −250, −230, −190, −170, −150, −130, −110, −90, −70, −50, −30, −10, 10, 30, 50, 70, 90, 110, 130, 150, 170, 190, 230, 250, 270, 290, 310, 330, 350, 370, 390, 410, 430, 450, 470, 490, 510, 530, 550, 570)

For another example, pilot tone indexing of all combinations which may use the pilot tones used for the two indexing methods as much as possible may also be used.

2.2.4. 4-Channel Bonding

Figure 19:
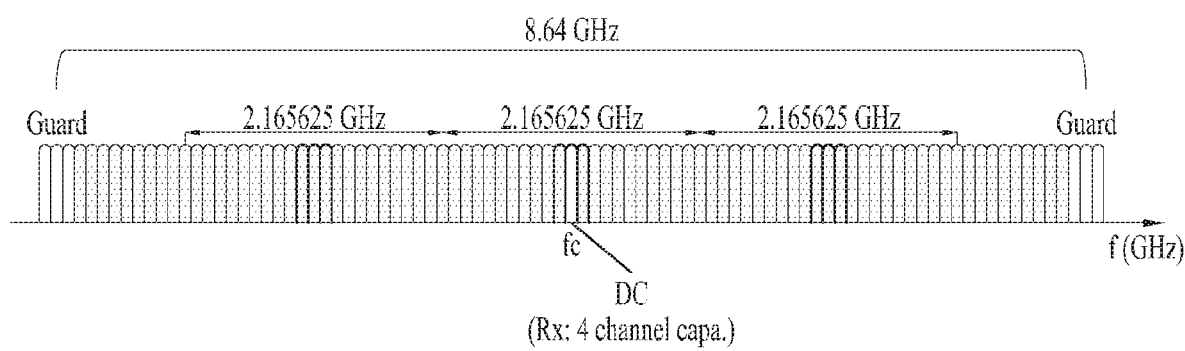
FIG. 19 is a diagram illustrating an OFDM frame structure for 4-channel bonding according to a second option of the present invention.

FIG. 19 is a diagram illustrating an OFDM frame structure for 4-channel bonding according to a second option of the present invention.

Since UEs having 4-channel bonding capability may only be used in an OFDM frame structure of a bandwidth corresponding to 4-channel bonding in FIG. 19, additional DC tones are not required unlike the OFDM frame structure for 2-channel bonding or the OFDM frame structure for 3-channel bonding.

In FIG. 19, $f_c$ means a center frequency of a bandwidth corresponding to four channels, and DC means a certain number of tones based on a center frequency of a bandwidth corresponding to four channels. For example, if three tones are used as DC tones, the three tones may have indexes (−1, 0 and 1).

At this time, the number of tones corresponding to DC may be set to 3 based on the center frequency, may be set to 1 corresponding to the center frequency, or may be set to 5 based on the center frequency. Also, two of the three tones based on the center frequency may be configured.

Also, pilot tones may be inserted in accordance with various methods. For example, the pilot tones may be inserted to tone positions having the following tone indexes.

1) Tone indexes=(−790, −770, −750, −730, −710, −690, −670, −650, −630, −610, −590, −570, −550, −530, −510, −490, −470, −450, −430, −410, −390, −370, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 370, 390, 410, 430, 450, 470, 490, 510, 530, 550, 570, 590, 610, 630, 650, 670, 690, 710, 730, 750, 770, 790)

For another example, pilot tone indexing of all combinations which may use the pilot tones used for the above indexing method as much as possible may also be used.

2.3. Third Option

The third option according to the present invention suggests an OFDM frame structure in which a position of DC is located at a center frequency of a corresponding bandwidth in accordance with a bandwidth corresponding to each channel bonding.

Figure 20:
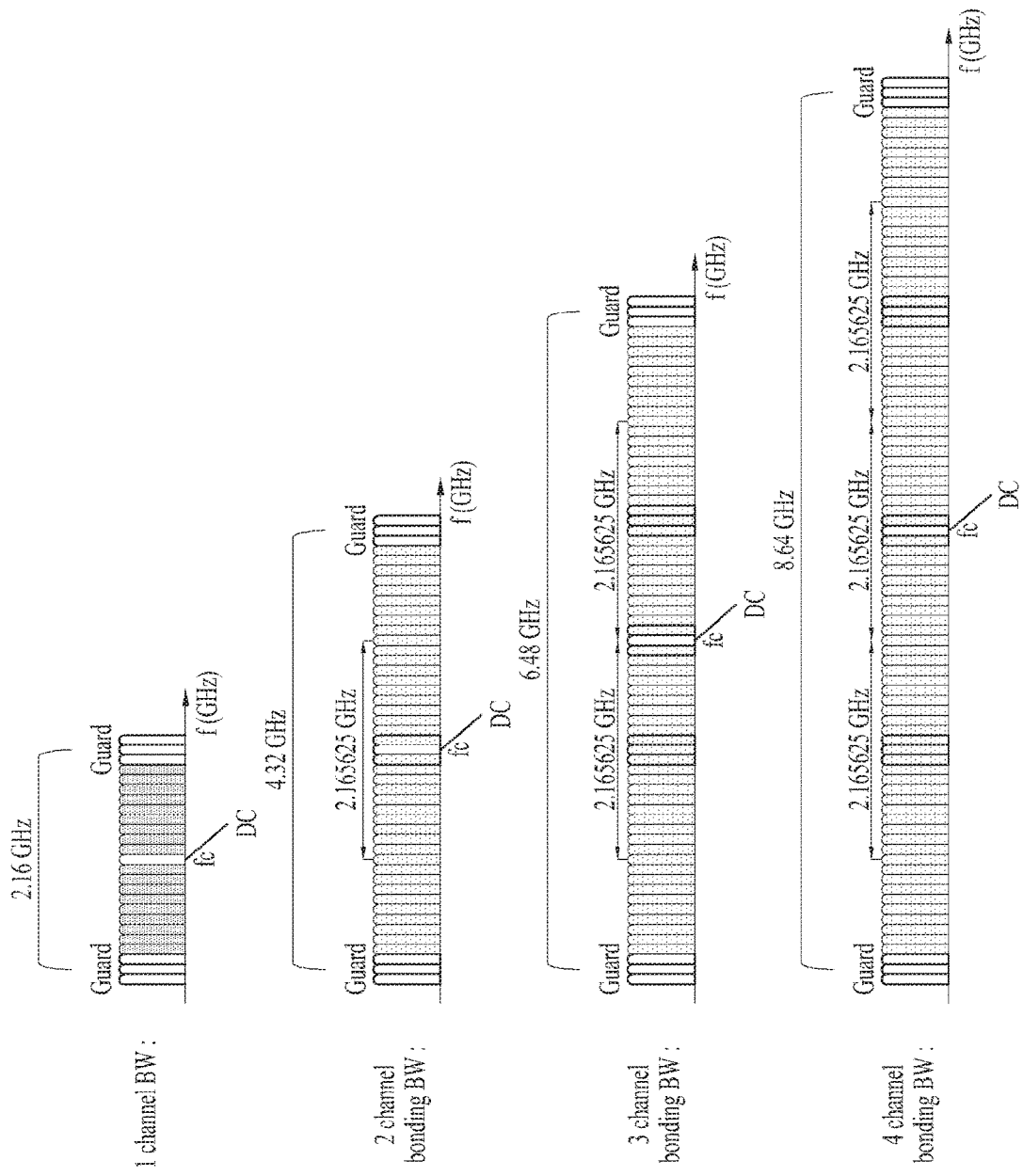
FIG. 20 is a diagram illustrating that an OFDM frame structure according to a third option of the present invention.

FIG. 20 is a diagram illustrating that an OFDM frame structure according to a third option of the present invention.

As shown in FIG. 20, an OFDM frame structure corresponding to each bandwidth includes only one DC. At this time, the DC may include a certain number of tones as described above. For example, the DC may include three tones based on a center frequency of a corresponding bandwidth, or may include only one tone corresponding to the center frequency. The DC may include three tones based on the center frequency of the corresponding bandwidth, or may include one tone corresponding to the center frequency, or may include five tones based on the center frequency. Also, the DC may include two of the three tones based on the center frequency.

At this time, as a tone plan (e.g., DC, pilot, data), the tone plan suggested in the first option or the second option may be reused. However, a position of the DC at a bandwidth corresponding to 2-channel bonding or 3-channel bonding may exist at the center of the bandwidth.

2.4. Fourth Option

Figure 21:
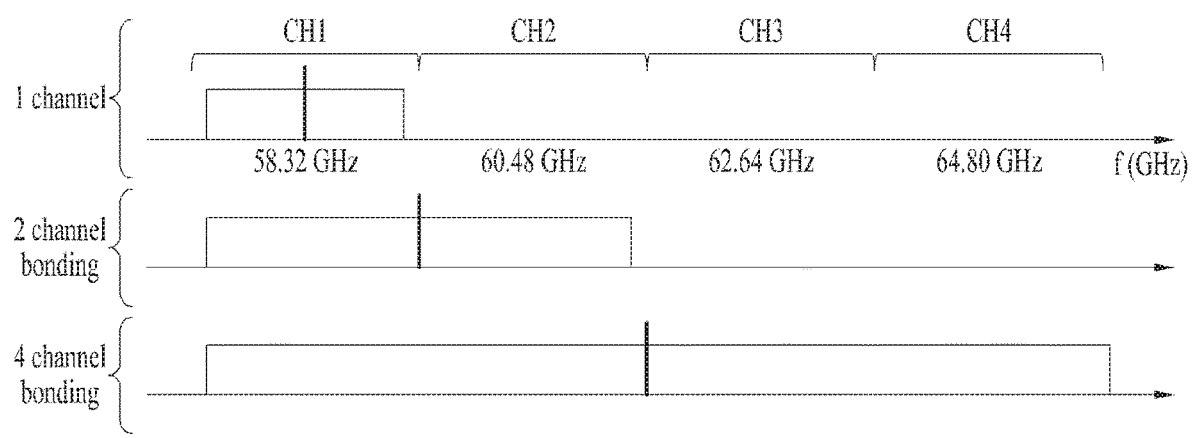
FIG. 21 is a diagram illustrating that an OFDM frame structure according to a fourth option of the present invention.

FIG. 21 is a diagram illustrating that an OFDM frame structure according to a fourth option of the present invention.

As shown in FIG. 21, the fourth option according to the present invention suggests an OFDM frame structure except 3-channel bonding. At this time, it may be assumed that the 11ay system according to the present invention does not support 3-channel bonding.

In this case, a position of DC required in accordance with a capability (e.g., FFT size, channel bonding capability, etc.) considered in the first option and the second option is not required additionally. This is because that the 11ay system according to the present invention does not support 3-channel bonding and thus the aforementioned problem is not considered.

Therefore, as the OFDM frame structure according to the fourth option of the present invention, only one OFDM frame structure may be considered per bandwidth as shown in FIG. 21.

Hereinafter, embodiments applicable as a signal transmission method based on the OFDM frame structures according to the above-described various methods will be described in detail. At this time, in the following description, enlarged embodiments applicable to the present invention will be described, and it will be apparent that signal transmission in the OFDM frame structure according to the present invention may be performed even by another signal transmission method in addition to the following description.

3. Additional Embodiment

3.1 First Additional Embodiment

If a signal is transmitted using the OFDM frame structure (particularly, the OFDM frame structure according to the third option or the fourth option) according to the aforementioned various methods, a PPDU format transmitted by the AP or UE may include a separate padding region in a time domain after an EDMG Header A.

Figure 22:
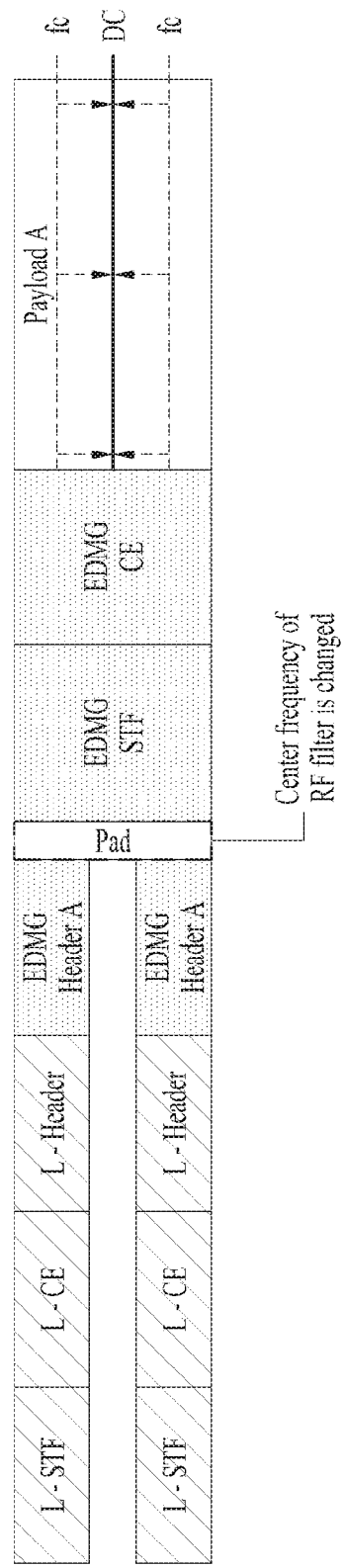
FIG. 22 is a diagram illustrating a 2-channel bonded PPDH format configuration according to a first additional embodiment of the present invention.

FIG. 22 is a diagram illustrating a 2-channel bonded PPDH format configuration according to a first additional embodiment of the present invention.

As shown in FIG. 22, the AP or UE may transmit a separate padding signal to a time domain after the EDMG Header A and a time domain prior to EDMG STF. At this time, a payload (e.g., Payload A) included in the corresponding PPDU format may be transmitted in such a manner that the aforementioned OFDM frame structure may be applied thereto.

A region (or dummy time) where the padding signal is transmitted may be configured separately from an EDMG STF field, or may include a certain time domain after an EDMG Header A field of the EDMG STF field.

Preferably, the payload may be transmitted in such a manner that the OFDM frame structure according to the third or fourth option is applied thereto, and the AP or UE which has received the PPDU format may control (or change) a center frequency of an RF filter to be matched with a bandwidth recognized through decoding of the EDMG Header A for a time domain where the padding signal is transmitted. That is, the AP or UE which has received the PPDU format may normally receive a payload, which is transmitted later, by changing a center frequency of the RF filter through the dummy time.

For example, if the UE having 3-channel bonding capability receives a 2-channel bonded PPDU format as shown in FIG. 22, the UE may normally receive the PPDU format by changing the center frequency of the RF filter to a frequency corresponding to DC at $f_c$ through the dummy time.

The PPDU format which includes the dummy time may be applied to even the case of 3-channel bonding.

3.2 Second Additional Embodiment

As another method, to apply the OFDM frame structure according to the third or fourth option according to the present invention, the 11ay system according to the present invention may restrictively support channel bonding as follows. In more detail, the 11ay system according to the present invention may support channel bonding except that a 2-channel bonded signal is transmitted to the UE having 3-channel bonding capability or a 3-channel bonded signal is transmitted to the UE having 4-channel bonding capability. In this case, it is advantageous in that the tone plan of the OFDM frame structure according to the third or fourth option may be reused.

3.3 Third Additional Embodiment

The above-described various OFDM frame structures may be applied to the following frequency division multiple access (FDMA) frame structures.

For example, one of the above-described various OFDM frame structures may be selected, and a frame structure per bandwidth may be defined for the selected OFDM frame structure in an FDMA RU size. Subsequently, a corresponding OFDM frame structure may be inserted into the FDMA frame structure in a block type in accordance with the FDMA RU size, whereby the FDMA frame structure may be configured.

For another example, if capabilities (e.g., channel bonding capability, FFT size, etc.) of the PCP/AP are different from those of the UE, in the FDMA frame structure, a DC tone may be located in a position corresponding to the center frequency of all channels and a position between channels subjected to frequency division multiplexing (FDM). At this time, the number of DC tones existing in each position may be provided equally or differently.

Figure 23:
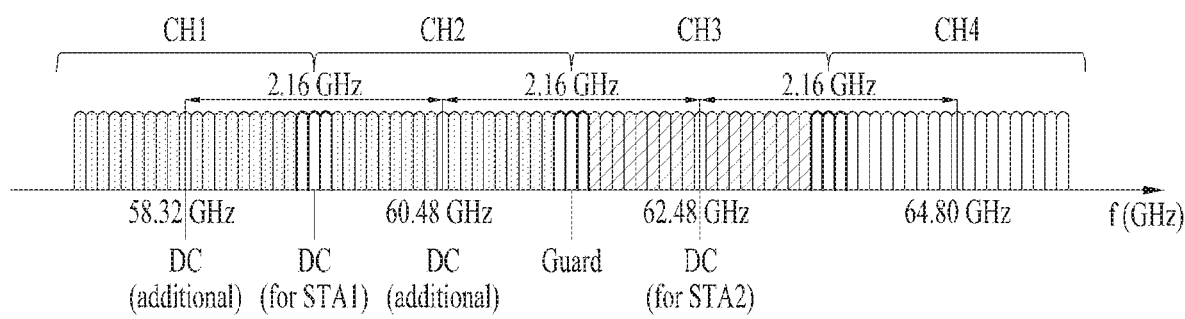
FIG. 23 is a diagram illustrating an example of an FDMA frame structure according to the present invention.

FIG. 23 is a diagram illustrating an example of an FDMA frame structure according to the present invention. Particularly, FIG. 23 illustrates one FDMA frame structure not a block wise.

In FIG. 23, DCs corresponding to the center between the respective channels should serve as guard tones for reducing neighboring channel interference that affects the other UEs in addition to a specific UE (e.g., STA 1 or STA 2). It is advantageous in that the guard tones (e.g., DC) may minimize mutual interference. Therefore, the number of DC tones (guard tones) located between the channels may be different from the number of DC tones located near a center frequency of a specific channel. Also, the number of DC tones (guard tones) located between the channels may be controlled to be matched with tone planes used for channel aggregation.

Figure 24:
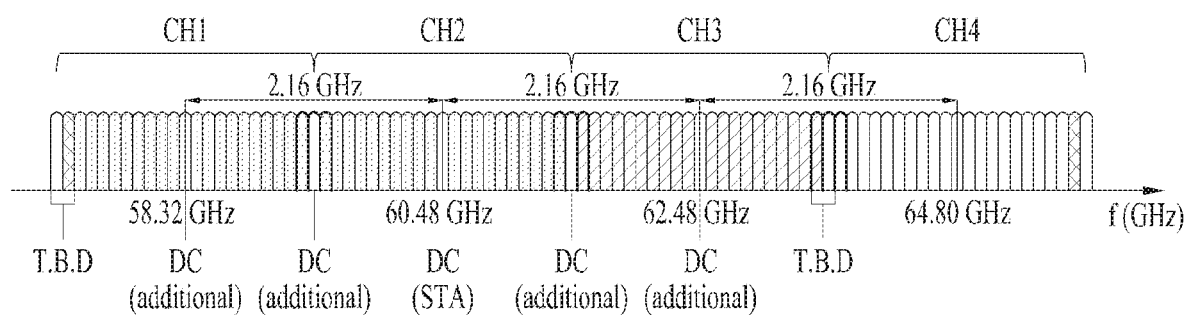
FIG. 24 is a diagram illustrating another example of an FDMA frame structure according to the present invention.

FIG. 24 is a diagram illustrating another example of an FDMA frame structure according to the present invention. Particularly, FIG. 24 illustrates one FDMA frame structure not a block wise.

In FIG. 24, DCs corresponding to the center between the respective channels do not have to serve as guard tones for reducing neighboring channel interference that affects the other UEs in addition to a specific UE (e.g., STA 1 or STA 2). Therefore, the number of DC tones located between the channels may be equal to the number of DC tones located near a center frequency of a specific channel (CH1, CH2, or CH3).

The station (hereinafter, first STA for convenience of description) according to the present invention may transmit a signal on the basis of the aforementioned method described in detail.

The first STA may determine a frame structure for bonding a plurality of channels intended to transmit a signal, and may transmit the signal to a second STA on the basis of the determined frame structure. At this time, the determined frame structure may include one or more first direct current (DC) tones located at the center of a bandwidth corresponding to the bonded channels and one or more second DC tones located to be spaced apart from the first DC tones at a certain interval.

In this case, the frame structure may be determined based on the number of the bonded channels, or may be determined based on the number of the bonded channels and indexes of the bonded channels.

For example, if the frame structure is determined based on the number of the bonded channels, the frame structure may be configured in a single frame structure in accordance with the number of the bonded channels as shown in FIG. 13.

In more detail, if the number of the bonded channels is 2, the frame structure in which the second DC tones are located to correspond to the center frequency of each of the bonded channels may be applied. Alternatively, if the number of the bonded channels is 3, the frame structure in which the second DC tones are located in a region between neighboring channels of the bonded channels may be applied.

For another example, if the frame structure is determined based on the number of the bonded channels and indexes of the bonded channels, different frame structures may be configured in accordance with the number of the bonded channels and the indexes of the bonded channels as shown in FIG. 12.

In more detail, if the bonded channels correspond to first and second channels of first to fourth channels sequentially located in a frequency domain, the frame structure in which the second DC tones are located to correspond to the center frequency of the second channel may be applied. Otherwise, if the bonded channels correspond to second and third channels of the first to fourth channels sequentially located in a frequency domain, the frame structure in which the second DC tones are located to correspond to the center frequency of the second channel and the center frequency of the third channel may be applied. Otherwise, if the bonded channels correspond to third and fourth channels of the first to fourth channels sequentially located in a frequency domain, the frame structure in which the second DC tones are located to correspond to the center frequency of the fourth channel may be applied. Otherwise, if the bonded channels correspond to first to third channels of the first to fourth channels sequentially located in a frequency domain, the frame structure in which the second DC tones are located in a region between the second and third channels may be applied. Otherwise, if the bonded channels correspond to second to fourth channels of the first to fourth channels sequentially located in a frequency domain, the frame structure in which the second DC tones are located in a region between the second and third channels may be applied.

The frame structure described as above may further include pilot tones and data tones. At this time, one or more of the pilot tones or the data tones may be located in a region between the first DC tone and the second DC tone.

The second STA corresponding to the first STA for transmitting a signal as above may be operated as follows to receive the signal from the first STA.

The first STA may determine a frame structure for bonding a plurality of channels through which a signal is to be transmitted, and may receive the signal from the second STA on the basis of the determined frame structure. At this time, the determined frame structure may include one or more first direct current (DC) tones located at the center of a bandwidth corresponding to the bonded channels and one or more second DC tones located to be spaced apart from the first DC tones at a certain interval.

4. Device Configuration

Figure 25:
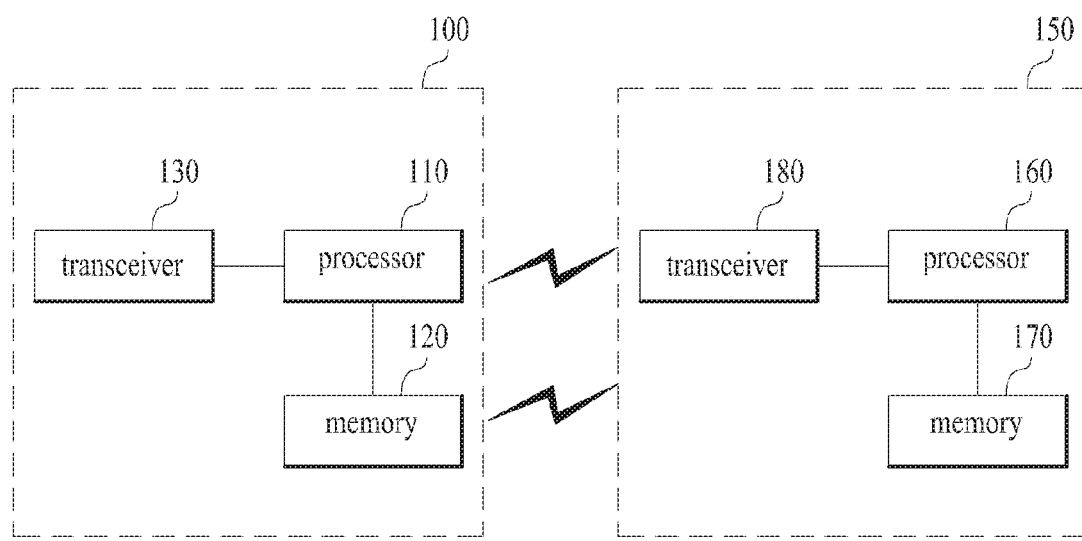
FIG. 25 is a diagram illustrating a device for implementing the aforementioned method.

FIG. 25 is a diagram illustrating devices for implementing the above-described method.

A wireless device 100 of FIG. 25 may correspond to a station for transmitting a signal based on the OFDM frame structure defined in the aforementioned description, and a wireless device 150 may correspond to a station for transmitting a signal based on the OFDM frame structure defined in the aforementioned description. At this time, each station may correspond to the 11ay UE or the PCP/AP. Hereinafter, for convenience of description, the station for transmitting a signal is referred to as a transmission device 100, and the station for receiving a signal is referred to as a reception device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120, 170 and executed by the processor 110, 160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although the present invention has been described on the assumption that the present invention is applied to IEEE 802.11 based wireless LAN system, the present invention is not limited thereto. The present invention may be applied to various wireless systems, which can perform data transmission based on channel bonding, in the same manner.

The invention claimed is:

1. A method for transmitting a signal by a first station (STA) to a second STA in a wireless LAN (WLAN) system, the method comprising:
configuring a physical protocol data unit (PPDU) signal including a first preamble field, a first header field, a second header field, a second preamble field and a payload field based on a channel bonding number of the second STA and a channel bonding number of the first STA;
determining a frame structure applied to the payload field for bonding a plurality of channels through which the PPDU signal is to be transmitted; and
transmitting the PPDU signal to the second STA based on the determined frame structure,
wherein the determined frame structure includes one or more first direct current (DC) tones located at a center of a bandwidth corresponding to the bonded channels,
wherein based on the channel bonding number of the second STA being different from the channel bonding number of the first STA, a padding field is further configured between the second header field and the second preamble field, and wherein the padding field corresponds to a switching time for a center frequency of the second STA to switch to the one or more first DC tones.

2. The method according to claim 1, wherein the frame structure is determined based on a number of the bonded channels, and
wherein the determined frame structure further includes one or more second DC tones located to be spaced apart from the one or more first DC tones at a certain interval.

3. The method according to claim 2, wherein when the number of the bonded channels is 2, the one or more second DC tones are located to correspond to a center frequency of each of the bonded channels.

4. The method according to claim 2, wherein when the number of the bonded channels is 3, the one or more second DC tones are located in a region between neighboring channels of the bonded channel.

5. The method according to claim 1, wherein the frame structure is determined based on a number of the bonded channels and indexes of the bonded channels, and
wherein the determined frame structure further includes one or more second DC tones located to be spaced apart from the one or more first DC tones at a certain interval.

6. The method according to claim 5, wherein, when the bonded channels are first and second channels of first to fourth channels sequentially located in a frequency domain, the one or more second DC tones are located corresponding to a center frequency of the second channel.

7. The method according to claim 5, wherein, when the bonded channels are second and third channels of first to fourth channels sequentially located in a frequency domain, the one or more second DC tones are located to correspond to a center frequency of the second channel and a center frequency of the third channel.

8. The method according to claim 5, wherein, when the bonded channels are third and fourth channels of first to fourth channels sequentially located in a frequency domain, the one or more second DC tones are located to correspond to a center frequency of the fourth channel.

9. The method according to claim 5, wherein, when the bonded channels are first to third channels of first to fourth channels sequentially located in a frequency domain, the one or more second DC tones are located in a region between the second channel and the third channel.

10. The method according to claim 5, wherein, when the bonded channels are second to fourth channels of first to fourth channels sequentially located in a frequency domain, the one or more second DC tones are located in a region between the second channel and the third channel.

11. The method according to claim 1, wherein the frame structure further includes a pilot tone and a data tone.

12. The method according to claim 11, wherein one or more of the pilot tone or the data tone are located in a region between the first DC tone and the second DC tone.

13. A method for receiving a signal by a second station (STA) from a first station (STA) in a wireless LAN (WLAN) system, the method comprising:
determining a frame structure for bonding a plurality of channels through which a physical protocol data unit (PPDU) signal is to be transmitted by a second STA; and
receiving the PPDU signal from the second STA based on the determined frame structure,
wherein the PPDU signal including a first preamble field, a first header field, a second header field, a second preamble field and a payload field is configured based on a channel bonding number of the second STA and a channel bonding number of the first STA,
wherein the frame structure is applied to the payload field,
wherein the determined frame structure includes one or more first direct current (DC) tones located at a center of a bandwidth corresponding to the bonded channels,
wherein based on the channel bonding number of the second STA being different from the channel bonding number of the first STA, a padding field is further configured between the second header field and the second preamble field, and
wherein the padding field corresponds to a switching time for a center frequency of the second STA to switch to the one or more first DC tones.

14. A station (STA) device for transmitting a signal in a wireless LAN (WLAN) system, the STA device comprising:
a transceiver having one or more radio frequency (RF) chains, configured to transmit and receive a physical protocol data unit (PPDU) signal to and from another STA; and
a processor connected with the transceiver, processing the PPDU signal transmitted to and received from the another STA,
wherein the processor is configured to configure a physical protocol data unit (PPDU) signal including a first preamble field, a first header field, a second header field, a second preamble field and a payload field based on a channel bonding number of the another STA and a channel bonding number of the STA,
wherein the processor is configured to determine a frame structure applied to the payload field for bonding a plurality of channels through which the PPDU signal is to be transmitted; and
transmit the PPDU signal to the another STA based on the determined frame structure, and
wherein the determined frame structure includes one or more first direct current (DC) tones located at a center of a bandwidth corresponding to the bonded channels
wherein based on the channel bonding number of the another STA being different from the channel bonding number of the STA, a padding field is further configured between the second header field and the second preamble field, and
wherein the padding field corresponds to a switching time for a center frequency of the another STA to switch to the one or more first DC tones.

15. A station device for receiving a signal in a wireless LAN (WLAN) system, the station device comprising:
a transceiver having one or more radio frequency (RF) chains, configured to transmit and receive a physical protocol data unit (PPDU) signal to and from another STA; and
a processor connected with the transceiver, processing the PPDU signal transmitted to and received from the another STA,
wherein the processor is configured to:
determine a frame structure for bonding a plurality of channels through which the PPDU signal is to be transmitted by the another STA; and
receive the PPDU signal from the another STA based on the determined frame structure,
wherein the PPDU signal including a first preamble field, a first header field, a second header field, a second preamble field and a payload field is configured based on a channel bonding number of the second STA and a channel bonding number of the first STA, wherein the frame structure is applied to the payload field,
wherein the determined frame structure includes one or more first direct current (DC) tones located at a center of a bandwidth corresponding to the bonded channels,
wherein based on the channel bonding number of the another STA being different from the channel bonding number of the STA, a padding field is further configured between the second header field and the second preamble field, and
wherein the padding field corresponds to a switching time for a center frequency of the another STA to switch to the one or more first DC tones.

* * * * *